(12) United States Patent
Chemin et al.

(10) Patent No.: US 9,726,136 B2
(45) Date of Patent: Aug. 8, 2017

(54) DEVICE FOR MAINTAINING VOLTAGE DURING STARTUP FOR A MOTOR VEHICLE

(71) Applicant: VALEO EQUIPEMENTS ELECTRIQUES MOTEUR, Creteil Cedex (FR)

(72) Inventors: Michaël Chemin, La Queue en Brie (FR); Pierre Sardat, Le Raincy (FR)

(73) Assignee: Valeo Equipements Electriques Moteur (FR)

( * ) Notice: Subject to any disclaimer, the term of this patent is extended or adjusted under 35 U.S.C. 154(b) by 452 days.

(21) Appl. No.: 14/368,195

(22) PCT Filed: Dec. 19, 2012

(86) PCT No.: PCT/FR2012/052998
§ 371 (c)(1),
(2) Date: Jun. 23, 2014

(87) PCT Pub. No.: WO2013/093343
PCT Pub. Date: Jun. 27, 2013

(65) Prior Publication Data
US 2014/0346864 A1     Nov. 27, 2014

(30) Foreign Application Priority Data

Dec. 22, 2011  (FR) ..................... 11 62262

(51) Int. Cl.
*B60R 22/00* (2006.01)
*F02N 11/08* (2006.01)
*B60R 16/03* (2006.01)

(52) U.S. Cl.
CPC ............ *F02N 11/087* (2013.01); *B60R 16/03* (2013.01); *F02N 11/0814* (2013.01); *Y02T 10/48* (2013.01)

(58) Field of Classification Search
CPC ...................................................... F02N 11/087
See application file for complete search history.

(56) References Cited

U.S. PATENT DOCUMENTS 6,325,035 B1 * 12/2001 Codina ............... F02N 11/0866
123/179.1
2007/0132313 A1 * 6/2007 Baeuerle ............... H02J 7/1438
307/10.1

FOREIGN PATENT DOCUMENTS

FR     2935156 A1 * 2/2010 .......... F02N 11/0866
JP     2002195139    7/2002
(Continued)

OTHER PUBLICATIONS

O. M. Alatise, I. Kennedy, G. Petkos, K. Khan, A. Koh and P. Rutter, "Understanding Linear-Mode Robustness in Low-Voltage Trench Power MOSFETs," in IEEE Transactions on Device and Materials Reliability, vol. 10, No. 1, pp. 123-129, Mar. 2010.*

*Primary Examiner* — Daniel Cavallari
(74) *Attorney, Agent, or Firm* — Berenato & White, LLC

(57) ABSTRACT

Device (DMT) arranged to provide an additional voltage, when the heat engine starts up, for the electrical power supply of the rotating electrical machine (AD). This additional voltage is added to a rated voltage of the on-board electrical system (RB) provided by a battery (BAT). The device comprises a second voltage source (Ucap) and electronic switches (K1, K2), each comprising at least one MOSFET transistor. At least one MOSFET transistor (K2) of the switches, mounted in series with the second voltage source, is controlled in linear mode at the end of the startup of the heat engine. Advantageously, the device comprises current control loops for controlling the transistors in linear mode.

25 Claims, 3 Drawing Sheets

(56) References Cited

FOREIGN PATENT DOCUMENTS

| | | |
|---|---|---|
| JP | 2003244805 | 8/2003 |
| JP | 2005207243 | 8/2005 |
| JP | 2008195294 | 8/2008 |

\* cited by examiner

DEVICE FOR MAINTAINING VOLTAGE DURING STARTUP FOR A MOTOR VEHICLE

CROSS-REFERENCE TO RELATED APPLICATIONS AND CLAIM TO PRIORITY

This application is a national stage application of International Application No. PCT/FR2012/052998 filed Dec. 19, 2012, which claims priority to French Patent Application No. 1162262 filed Dec. 22, 2011, of which the disclosures are incorporated herein by reference and to which priority is claimed.

FIELD OF THE INVENTION

The present invention relates in general to a device for maintaining voltage for a motor vehicle. More particularly, the invention relates to a device for maintaining voltage which can be used during the phases of starting of the thermal engine of a motor vehicle.

BACKGROUND OF THE INVENTION

The introduction into motor vehicles of systems for automatic stopping/restarting of the thermal engine, known as stop and go, has made the voltage constraints on the on-board electrical networks of the vehicles more critical.

In general, the power of the rotary electrical machine which ensures the starting of the thermal engine has been increased in order to facilitate the starting of the engine and prevent a certain number of disadvantages which the multiple operations of restarting of the engine could cause for the users. Consequently, there is a higher current spike drawn from the battery during starting of the engine, and correspondingly large voltage drops on the on-board network. This problem of large voltage drops arises in the two architectures known in the stop and go system, i.e. the architecture with an alternator-starter and the architecture with a restarter, also known as reinforced starter.

The integration of a device for maintaining voltage in a system for automatic stopping/restarting of the thermal engine is a possible response to the aforementioned problem. In the system with an alternator-starter, the integration of a device for maintaining voltage also has the advantage of permitting an increase in the torque of the machine, which increase in the torque is derived from the possibility of supplying the excitation circuit of the rotor with a voltage which is far higher than the nominal voltage of 14 V, of the conventional on-board network.

In the prior art, a system created by the inventive body is known, with an alternator-starter equipped with a device for maintaining voltage, which can make the on-board network voltage increase to a value of approximately 17.5 V.

It will be noted however that most of the electronic accessories and equipment which are connected to the on-board network of the vehicle are not designed to withstand repeatedly an on-board network voltage of approximately 17.5 V. In fact, these electronic accessories and equipment have generally been designed for a standard on-board network of 12 V.

SUMMARY OF THE INVENTION

It is therefore desirable to propose solutions which permit better control of the on-board network voltage in a vehicle equipped with a device for maintaining voltage, by reducing to a minimum the period of time during which the device imposes a high voltage on the on-board network.

According to a first aspect, the present invention relates to a device for maintaining voltage, designed to be associated with a rotary electrical machine which fulfils a function of starting of the thermal engine of a motor vehicle, this device being designed, when the thermal engine is started, to supply an additional voltage for an electrical supply of the rotary electrical machine, this additional voltage being added to a nominal voltage of the on-board electrical network of the vehicle which is supplied by a battery contained in the vehicle as the main source of voltage, with the device comprising a second source of voltage and first and second electronic switches, each comprising at least one transistor of the MOSFET type.

According to the invention, at least one MOSFET transistor of the second switch, mounted in series with the second source of voltage, is controlled in linear mode at the end of starting of the thermal engine.

According to another particular characteristic, the MOSFET transistor functioning in linear mode at the end of starting of the thermal engine functions in all-or-nothing switching mode during the remainder of the starting operation.

According to yet another particular characteristic, the device comprises a current control loop for the control in linear mode of the transistor of the second electronic switch.

According to yet another particular characteristic, the electric current which circulates in the transistor in linear mode is controlled by a set value supplied as input to the current control loop.

According to a particular embodiment of the invention, the second electronic switch comprises a plurality of MOSFET transistors mounted in parallel, this plurality of MOSFET transistors being mounted in series with the second source of voltage. The set of transistors can be controlled in linear mode at the end of starting of the thermal engine, and for each transistor the device comprises a current control loop to control the transistor in linear mode.

In fact, in certain applications of the invention, it is necessary to mount a plurality of MOSFET transistors in parallel, such as to be able to pass through them currents with a large spike. In the prior art, this putting of the MOSFET transistors into parallel poses problems during phases of the functioning of these transistors in linear mode, since firstly, this functioning mode is thermally unstable, and secondly, the manufacturing dispersion in relation to the Vsgth (source-to-gate threshold voltage) of the MOSFET transistors gives rise to a large difference of the current conducted by each of the transistors. In the present invention, the incorporation of current control loops to control the MOSFET transistors mounted in parallel guarantees satisfactory functioning, despite the disparities which exist in the transistors in relation to the Vsgth voltages and the transconductances, as well as in relation to the temperatures and thermal couplings between transistors, without needing to grade the transistors during production. In addition, the lack of constraints on the thermal couplings of the transistors makes it possible to use different power substrates for the transistors, and in particular a substrate of an isolated metal type (SMI).

According to another particular characteristic of the invention, the first switch comprises at least one MOSFET transistor controlled in so-called all-or-nothing switching mode.

According to another particular embodiment of the invention, the second source of voltage comprises a supercapacitor. In this case, the device can comprise a direct-direct converter connected to the second source of voltage, in order to charge the supercapacitor.

According to another aspect, the invention also relates to a system for starting a thermal engine comprising a device for maintaining voltage as described briefly above.

BRIEF DESCRIPTION OF THE DRAWINGS

The invention is now described by means of different embodiments, with reference to the appended drawings. It should be noted that these drawings serve the purpose simply of illustrating the text of the description, and do not constitute in any way a limitation of the scope of the invention.

DETAILED DESCRIPTION

Figure 1:
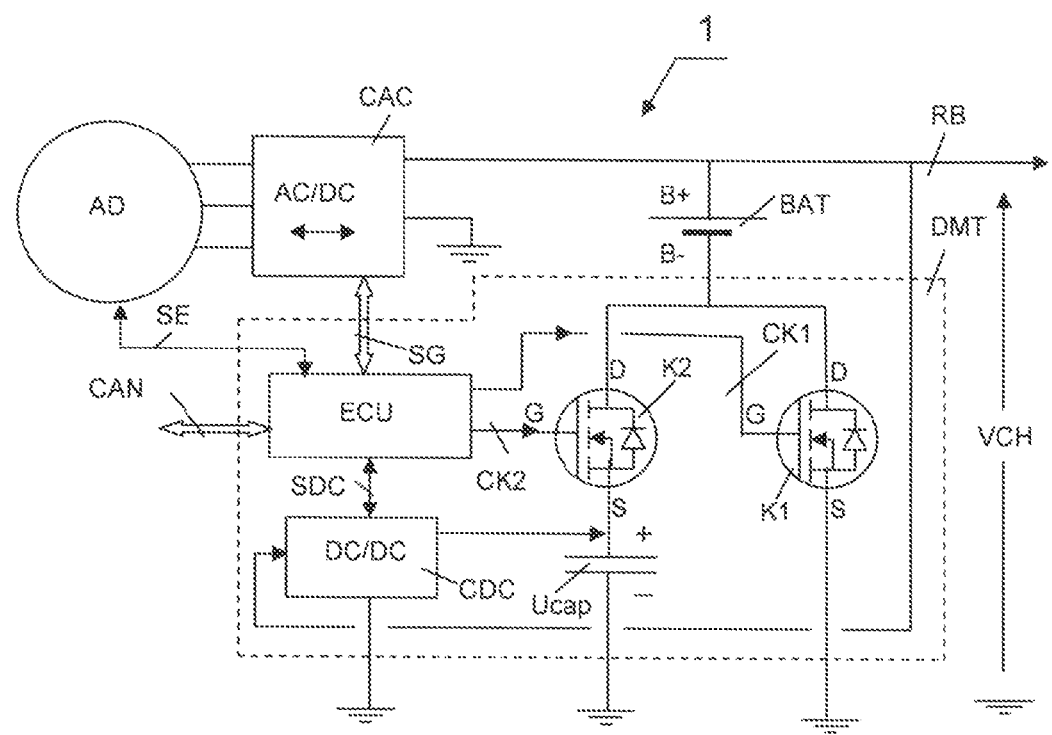
FIG. 1 shows a system for starting a thermal engine with an alternator-starter, equipped with a device for maintaining voltage.

A system for starting a thermal engine with an alternator starter 1 equipped with a device for maintaining voltage DMT is shown in FIG. 1.

The system for starting a thermal engine 1 substantially comprises an alternator-starter AD, a reversible alternating-direct (AC/DC) converter CAC, an electronic control unit ECU, and a device for maintaining voltage DMT.

A battery BAT is connected to the on-board electrical network RB of the vehicle. A positive terminal B+ of the battery BAT is connected to the cables with positive polarity of the network RB. A negative terminal B− of the battery BAT is connected by means of the device for maintaining voltage DMT to the earth (bodywork of the vehicle) of the on-board electrical network RB.

The alternator-starter AD is a reversible electrical machine which can be used firstly as an electric generator when it is driven by the thermal engine, and secondly as an electric motor for starting of the thermal engine with which it is associated.

The converter CAC is a reversible converter which can function as a rectifier bridge when the alternator-starter AD is in electric generator mode, and in inverter mode when the alternator-starter AD is in electric motor or starter mode. The converter CAC is habitually constructed around a power transistor bridge, for example of the MOSFET type, and is connected firstly to the stator windings of the stator of the alternator-starter, and secondly to the on-board electrical network RB of the vehicle. When the alternator-starter AD is in electric motor mode, the transistors of the converter CAC are controlled sequentially, and supply power to the stator phase windings synchronously.

The electronic control unit ECU is constructed in a conventional manner around a microcontroller. The unit ECU is connected to a control unit of the vehicle (not represented) by means of a communication bus, for example of the CAN type. By means of this communication bus, the unit ECU receives from the vehicle control unit orders and instructions which the unit ECU breaks down into control signals for the alternator-starter AD, the converter CAC and the device for maintaining voltage DMT. In addition, state information, such as alarms, obtained from the alternator-starter AD, the converter CAC and the device for maintaining voltage DMT, can be returned to the unit ECU by means of communication connections provided with these functional elements.

The unit ECU thus supplies an excitation control signal SE to the alternator-starter AD, and switching control signals SG to the converter CAC. The signal SE determines the excitation current by supplying power to an excitation coil of the rotor of the machine AD. The signals SG command switching operations of the power transistors of the converter CAC, and determine the functioning mode of the latter. In addition, the unit ECU supplies control signals CK1, CK2 and SDC to the device for maintaining voltage DMT.

As shown in FIG. 1, the device for maintaining voltage DMT substantially comprises two controlled electronic switches K1 and K2, a supercapacitor unit Ucap and a direct-direct (DC/DC) load converter.

The general principle of the device for maintaining voltage DMT consists of putting a second source of voltage into series with the battery BAT during the operation of starting of the thermal engine. This secondary source of voltage is in this case the supercapacitor unit Ucap. During the starting of the thermal engine, the converter CAC is thus supplied with a voltage higher than that of 14 V which is generally present on the on-board network RB of the vehicle. This higher voltage makes it possible to increase the torque of the machine AD during starting, and guarantees the maintenance of a voltage level which is sufficient for the set of equipment and accessories connected to the on-board network RB.

The controlled switches K1 and K2 are in this case MOSFET transistors of type N.

The transistor K1 comprises a drain electrode D which is connected to the drain electrode D of the transistor K2 and to the negative terminal B− of the battery BAT. A source electrode S of the transistor K1 is connected to the earth of the circuit. The terminal B− of the battery BAT is thus connected to the earth when saturation of the transistor K1 is commanded (switch closed). The transistor K1 is controlled by the unit ECU by means of the control signal CK1.

The transistor K2 comprises a source electrode S which is connected to a positive terminal + of the supercapacitor unit Ucap, a negative terminal − of which is connected to the earth of the circuit. When saturation of the transistor K2 is commanded (switch closed), the supercapacitor Ucap, as the second source of voltage, is put into series with the battery BAT which constitutes the main source of voltage. The transistor K2 is controlled by the unit ECU by means of the control signal CK2.

In this case, the supercapacitor unit Ucap is formed by two cells mounted in series, each cell having a capacity of approximately 1200 F. The charging of the supercapacitor unit Ucap is ensured by the converter CDC which is supplied by the battery BAT. The level of charging of the supercapacitor unit Ucap is controlled and managed by the unit ECU by means of the signal SDC supplied by the latter to the converter CDC. Typically, the supercapacitor unit Ucap is charged to a nominal voltage of approximately 5 V.

It will be noted that, according to the invention, the transistor K1 functions only in so-called all-or-nothing switching mode (i.e. either in the closed state, or in the open state), whereas the transistor K2 functions in switching mode and in linear mode. The conduction of the transistors K1 and K2 is never actuated simultaneously. At the same moment, the transistors K1 and K2 are in opposite functioning states. When the transistor K1 is saturated (closed), the transistor K2 is blocked (open). When the transistor K1 is blocked (open), the transistor K2 is either saturated (closed) or in linear mode with controlled resistance Rds (drain-source resistance).

In the state of rest of the device DMT, i.e. outside the starting phases of the thermal engine, the transistor K1 is saturated and the transistor K2 is blocked. The voltage of the on-board network RB is then the nominal voltage of 14 V, determined by the battery BAT which is of the lead battery type. The supercapacitor Ucap is kept charged by the converter CDC.

When a starting order is received by the unit ECU, the device DMT is activated, by commanding by means of the signals CK1 and CK2 the blocking of the transistor K1 and the saturation of the transistor K2. The battery BAT and the supercapacitor unit Ucap are then connected in series, and supply the converter CAC with a high network voltage VCH of approximately 17.5 V unloaded. This voltage VCH drops during the starting operation as a result of the different resistances of the circuit, i.e. the internal resistances of the battery BAT and of the supercapacitor unit Ucap, as well as those of the transistor K2 and of the connection cables.

At the end of the starting operation, the voltage VCH tends to rise towards the unloaded voltage 17.5 V, as a result of a decrease in the current collected. According to the invention, the transistor K2 is then controlled in linear mode by means of the control signal CK2, such as to introduce a significant resistance Rds into the electric circuit, and to make the voltage VCH drop between the terminal B+ and the earth. A control software module (not represented) is provided for this purpose in the unit ECU. The electronic accessories and equipment connected to the on-board network of the vehicle are thus subjected to the high voltage VCH (17.5 V) only for the minimum time necessary for starting of the thermal engine.

In this embodiment, the transistor K2 is controlled in linear mode, such as to limit the voltage VCH to a maximum value of 15 V at the end of the operation of starting of the thermal engine.

Figure 2:
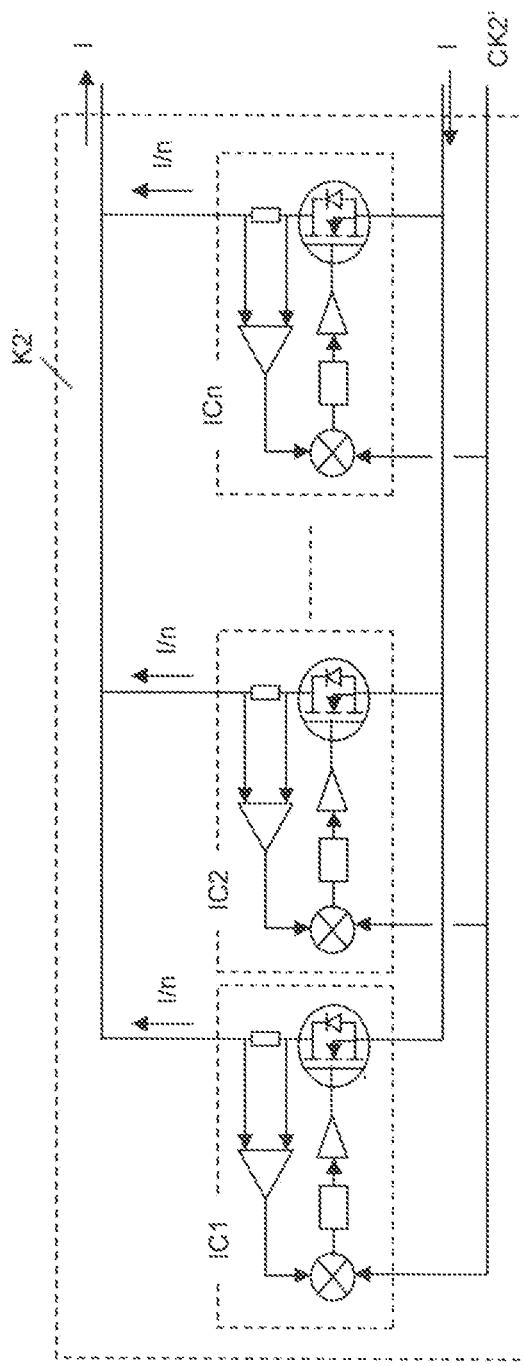
FIG. 2 shows an electronic switch which can be controlled in linear mode, and is included in a particular embodiment of the device according to the invention, this electronic switch comprising a plurality of MOSFET transistors which are mounted in parallel and equipped with current control loops.
Figure 3:
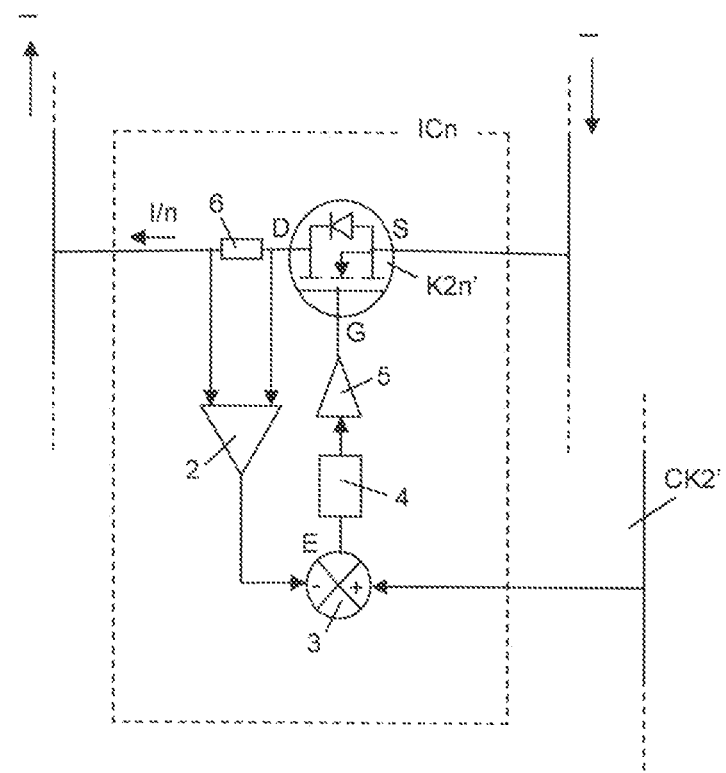
FIG. 3 shows a MOSFET transistor which is equipped with a current control loop, and is included in the electronic switch in FIG. 2.

With reference also to FIGS. 2 and 3, a description is provided hereinafter of an embodiment of the device for maintaining voltage according to the invention, wherein the electronic switches K1 and K2 are replaced by switches K1' (not represented) and K2', each comprising a plurality of MOSFET transistors mounted in parallel. Only the switch K2' is described here in detail, in the knowledge that the structure and functioning of a switch K1' formed with a plurality of MOSFET transistors in parallel, functioning in all-or-nothing switching mode, are known to persons skilled in the art.

FIG. 2 shows a general architecture of the switch K2' according to the present invention. The switch K2' comprises mounting in parallel of n switches IC1 to ICn, each having a MOSFET transistor, in this case of the N Channel type, and a current control loop. Each switch ICn then conveys a current I/n and receives a corresponding set value CK2', in the knowledge that the total current which the switch K2' must convey is equal to I.

As shown in FIG. 3, in this embodiment, the current control loop for the transistor K2n' included in the switch K2' comprises substantially a differential amplifier 2, a subtracter amplifier 3, a corrector 4, a driver amplifier 5, and a current measurement shunt 6.

In the same way as for the transistor K2 in the embodiment in FIG. 1, the transistor K2n' can function according to two modes during the operation of starting of the thermal engine, i.e. firstly in all-or-nothing switching mode, and then, at the end of starting, in linear mode, such as to limit the voltage VCH. These two modes of functioning of the transistor K2n' are controlled by means of the value allocated to the set value CK2'.

The differential amplifier 2 collects from the terminals of the shunt 6 voltage information which is representative of the real current I/n which passes through the transistor K2n'.

The real current information I/n is counter-reaction information which is applied to a − input of the subtracter 2. A + input of the subtracter 3 receives the set value CK2' in the form of a control signal supplied by the unit ECU (cf. FIG. 1). The transistor K2n' is controlled by an error signal E between the set value CK2' and the real current I/n. The error signal E is applied to the gate G of the transistor K2n' by means of the corrector 4 and the driver amplifier 5. Typically, the corrector 4 is of the proportional-integral type (PI).

The current control loops which are associated with the transistors of the switch K2' permit accurate control of the point of functioning of the transistors. It is thus possible to control the transistors according to the two functioning modes advocated by the invention, whilst guaranteeing very good stability in linear mode.

It will be appreciated that the current control loop previously described with reference to FIG. 3 can be integrated in the embodiment in FIG. 1, in order to control the MOSFET transistor K2.

Different embodiments of the invention other than those previously described are within the scope of persons skilled in the art instructed by the teaching provided to them by the present description.

The invention claimed is:

1. Device for maintaining voltage (DMT), designed to be associated with a rotary electrical machine (AD) which fulfils a function of starting of the thermal engine of a motor vehicle, this device (DMT) being designed, when the thermal engine is started, to supply an additional voltage for an electrical supply of the rotary electrical machine (AD), this additional voltage being added to a nominal voltage of the on-board electrical network (RB) of the vehicle which is supplied by a battery (BAT) contained in the vehicle as the main source of voltage, with the device comprising a second source of voltage (Ucap) and first and second electronic switches (K1, K2), each comprising at least one transistor of the MOSFET type, wherein at least one MOSFET transistor (K2, K2n') of the switches, is mounted in series with the second source of voltage (Ucap), the device further comprising an ECU configured to control the at least one MOSFET transistor of the switches wherein the ECU controls the at least one MOSFET transistor of the switches in linear mode at the end of starting of the thermal engine.

2. Device according to claim 1, wherein said ECU is further configured to control said MOSFET transistor functioning in linear mode at the end of starting of the thermal engine functions in either an open state, or in a closed state during the remainder of the starting operation.

3. Device according to claim 1, characterized in that it comprises a current control loop (2, 3, 4, 5, 6) for the control in linear mode of the transistor (K2, K2n') of the second electronic switch.

4. Device according to claim 3, characterized in that the ECU is further configured to control and limit electric current (I, I/n) which circulates in the transistor (K2, K2n')

in linear mode by a set value (CK2') supplied as input to the current control loop (2, 3, 4, 5, 6).

5. Device according to claim 1, characterized in that the second electronic switch comprises a plurality (n) of MOSFET transistors (IC1, IC2, . . . ICn) mounted in parallel, the plurality of MOSFET transistors being mounted in series with the second source of voltage (Ucap).

6. Device according to claim 5, characterized in that said ECU is further configured to control each of the transistors (IC1, IC2, . . . ICn) in linear mode at the end of starting of the thermal engine, and the device comprises for each transistor a current control loop (2, 3, 4, 5, 6) for the control in linear mode of the transistor.

7. Device according to claim 1, characterized in that the first switch (K1) comprises at least one MOSFET transistor controlled by said ECU so as to be in either an open state or in a closed state.

8. Device according to claim 1, characterized in that the second source of voltage comprises a supercapacitor (Ucap).

9. Device according to claim 8, characterized in that it comprises a direct-direct converter (CDC) connected to the second source of voltage, in order to charge the supercapacitor (Ucap).

10. System for starting a thermal engine, characterized in that it comprises a device for maintaining voltage (DMT) according to claim 1.

11. Device according claim 2, characterized in that it comprises a current control loop (2, 3, 4, 5, 6) for the control in linear mode of the transistor (K2, K2n') of the second electronic switch.

12. Device according to claim 2, characterized in that the second electronic switch comprises a plurality (n) of MOSFET transistors (IC1, IC2, . . . ICn) mounted in parallel, the plurality of MOSFET transistors being mounted in series with the second source of voltage (Ucap).

13. Device according to claim 3, characterized in that the second electronic switch comprises a plurality (n) of MOSFET transistors (IC1, IC2, . . . ICn) mounted in parallel, the plurality of MOSFET transistors being mounted in series with the second source of voltage (Ucap).

14. Device according to claim 4, characterized in that the second electronic switch comprises a plurality (n) of MOSFET transistors (IC1, IC2, . . . ICn) mounted in parallel, the plurality of MOSFET transistors being mounted in series with the second source of voltage (Ucap).

15. Device according to claim 2, characterized in that the first switch (K1) comprises at least one MOSFET transistor controlled by said configured ECU to be in either an open or in a closed state.

16. Device according to claim 3, characterized in that the first switch (K1) comprises at least one MOSFET transistor controlled by said configured ECU to be in either an open or in a closed state.

17. Device according to claim 4, characterized in that the first switch (K1) comprises at least one MOSFET transistor controlled by said configured ECU to be in either an open or in a closed state.

18. Device according to claim 5, characterized in that the first switch (K1) comprises at least one MOSFET transistor controlled by said configured ECU to be in either an open or in a closed state.

19. Device according to claim 6, characterized in that the first switch (K1) comprises at least one MOSFET transistor controlled by said configured ECU to be in either an open or in a closed state.

20. Device according to claim 2, characterized in that the second source of voltage comprises a supercapacitor (Ucap).

21. Device according to claim 3, characterized in that the second source of voltage comprises a supercapacitor (Ucap).

22. Device according to claim 4, characterized in that the second source of voltage comprises a supercapacitor (Ucap).

23. Device according to claim 5, characterized in that the second source of voltage comprises a supercapacitor (Ucap).

24. Device according to claim 6, characterized in that the second source of voltage comprises a supercapacitor (Ucap).

25. Device according to claim 7, characterized in that the second source of voltage comprises a supercapacitor (Ucap).

* * * * *